Sept. 29, 1959 M. DRUBIN 2,906,965

HIGH FREQUENCY MULTIVIBRATOR

Filed Aug. 13, 1957

INVENTOR.
MEIR DRUBIN

BY H. L. Mackey

ATTORNEY.

United States Patent Office 2,906,965
Patented Sept. 29, 1959

2,906,965

HIGH FREQUENCY MULTIVIBRATOR

Meir Drubin, Tarrytown, N.Y., assignor to General Precision Laboratory Incorporated, a corporation of New York Application August 13, 1957, Serial No. 677,946

3 Claims. (Cl. 331—145)

This invention relates to series or shunt-regulated vacuum tube amplifiers containing a feedback connection. Such circuits include or may be components of multivibrators, trigger circuits and many other electronic circuits. When such circuits are improved in accordance with this invention they become useful in the megacycle frequency range and in pulse signal applications.

When the invention is applied to such series circuits employed as amplifiers it greatly increases the upper limit of frequency range and with proper proportioning of components provides extremely broad band amplifiers. Additionally, it provides an amplifier output of low impedance which is relatively constant throughout the signal cycle. When the invention is applied to multivibrators it provides short rise and fall times with good linearity. It greatly extends both the bandwidth and the upper frequency limit of the output of astable multivibrators.

The invention is based on the use of the series feedback amplifier which has the virtues of high linearity and low output impedance. Such an amplifier consists most simply of two electronic discharge tubes with one cathode connected through a resistor to the other anode, and with a negative feedback connection from the control grid of the first tube to the anode of the second. The input is applied to the control grid of the second tube and the output is taken from the cathode of the first tube. In such a circuit the second tube acts as a voltage amplifier and the first tube as a power amplifier. The output terminal has low impedance during signal conduction because the first tube behaves somewhat like a cathode follower. Its cathode output impedance, $Z_0$, when the second tube is a triode, is given by $$Z_0=\frac{r_{p1}[r_{p2}+R_k]}{r_{p1}+r_{p2}+(1+\mu_1)R_k} \quad (1)$$

in which $r_{p1}$ and $r_{p2}$ are the plate resistances of the first and second tubes respectively, $R_k$ is the resistance externally connected to the cathode of the first tube, and $\mu_1$ is the amplification factor of the first tube. When the second tube is a pentode the output impedance becomes $$Z_0=\frac{r_{p1}}{\mu_1}\cdot\frac{r_{p1}+\mu_1 R_k}{R_k} \quad (2)$$

These Equations 1 and 2 demonstrate that the output impedance of any series amplifier is low. The linearity of a series amplifier is due to its negative feedback connection.

Although the series amplifier circuit has these virtues, its usefulness is severely limited in the conventional form just described because it inherently has a long time constant. Its time constant is numerically equal to RC, in which C is the sum of interelectrode and stray capacitances charged by the signal and R is the resistance of the capacitance discharge path. For present purposes the pertinent resistance R of the discharge path is that applied to the first grid through the feedback connection from the second anode. When the second tube is conducting, this resistance is very nearly three-quarters of the plate resistance of the lower tube. This resistance may easily be, and frequently is, high enough severely to limit the upper end of the band of frequency transmission in the case of amplifiers, and the upper limit of frequency generation in the case of a free-running multivibrator composed of two such series amplifiers, the upper limit of sinusoidal amplification or of sinusoidal frequency generation being about 1 mc.s. The conventional series amplifier is usually considered quite unsuited for pulse signal applications where pulse shape must be preserved, because neither the rise time nor the fall time can be made much less than 1 $\mu$sec.

The present invention substantially frees series amplifiers from this limitation by greatly increasing their upper frequency limit. This is accomplished by providing an additional, relatively low impedance path from the second anode to ground. This causes the feedback connection to the first control grid to have a low impedance path presented to it during all parts of the signal cycle, so that the time constant never becomes large. Furthermore this addition prevents the amplifier output impedance from ever rising to a high value even when the second tube is cut off, as in multivibrator operation. Without this addition, when a pulse applied to a series amplifier cuts off the second tube current, it of necessity also cuts off the first tube current, causing the output impedance to rise toward infinity.

The principal purpose of this invention is to provide an improved series amplifier having high frequency transmissibility.

Another purpose of this invention is to provide a free-running linear multivibrator able to oscillate at high frequencies.

Another purpose is to provide monostable and bistable multivibrators having extremely short rise and fall times.

Another purpose is to apply the series amplifier configuration to pulse circuits requiring short rise and fall times.

Further understanding of this invention may be secured from the detailed description and drawings, in which.

Figure 1:
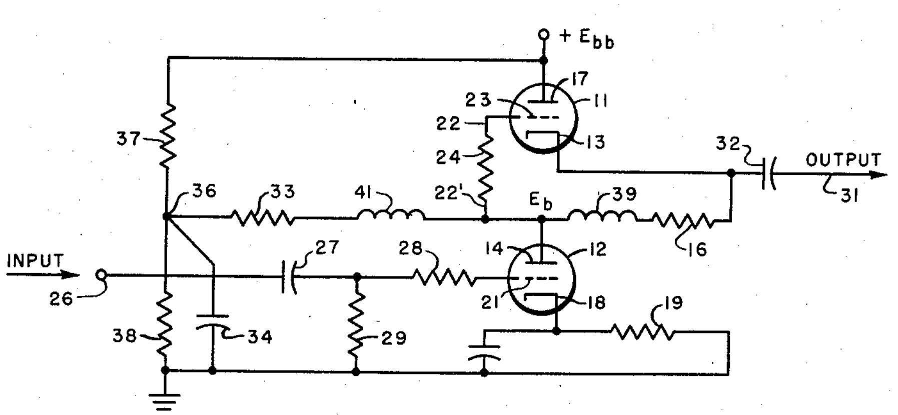
Figure 1 is a schematic diagram of a series amplifier incorporating this invention.

Referring now to Fig. 1, a tube 11 and a tube 12 comprise a series amplifier. These tubes are here illustrated as triodes but either one or both may be of another type. The cathode 13 is connected to the anode 14 through a resistor 16 having the functions of providing cathode bias for the grid 23 and of improving the gain. As an example, this resistor may have a resistance of 300 ohms. Plate voltage $+E_{bb}$ is applied between anode 17 and cathode 18, the latter being connected through a small bypassed resistor 19 to provide static bias for the grid 21. A feedback connection 22 is provided between the grid 23 and the anode 14. This connection may include but does not necessarily contain a small series resistor 24 to prevent parasitic oscillation. In the absence of resistor 24 the connection between grid 23 and anode 14 will be conductive and have substantially no resistance. Input signals are applied from terminal 26 to the grid 21, preferably through a capacitor 27 to isolate direct potentials and through an antiparasitic resistor 28. The shunt resistor 29 lowers and defines the input signal impedance. Output is derived from the conductor 31 connected to the cathode 13, preferably through a capacitor 32 isolating the output conductor from the direct current voltage level of cathode 13.

As so far described this series amplifier is conventional. Its frequency transmission capability is limited at the upper end by its large time constant. This time constant is controlled by the capacitance of the grid 23 and its effective discharge resistance R to ground which is a major fraction of the plate resistance of the tube 12. When the tube 12 is a triode the resistance R during signal conduction is given by $$R=\frac{r_{p2}[r_{p1}+(1+\mu_1)R_k]}{r_{p1}+r_{p2}+(1+\mu_1)R_k} \qquad (3)$$

When the tube 12 is a pentode, $$R=r_{p1}+\mu_1 R_k \qquad (4)$$

By the use of these tubes and representative capacitance values it becomes evident that, for conventional series amplifiers during signal conduction, the time constant will never be less than of the order of 1 microsecond. The waveform rise and fall times will be accordingly limited and sinusoidal transmission frequencies will be limited to not over about 1 megacycle per second.

When the amplifier is used to amplify waveforms which during part of the cycle completely cut off the tube 12, R becomes substantially infinite and so does the time constant which then has an adverse effect on the transmission of high frequencies. Also during this part of the cycle the tube 11 current is cut off completely, so that the output impedance rises substantially to infinity. Thus the use for pulse signals of the circuit as so far described presents very grave problems.

This invention modifies the conventional series amplifier circuit as so far described by adding a small resistor 33 connected in series with a large capacitor 34 between the feedback conductor 22' and ground. As an explicit example the resistor 33 has a resistance of 3300 ohms and the capacitor 34 has a capacitance of 0.1 mf. Such a capacitor has practically zero impedance at the frequencies of interest. In is to be understood, however, that the resistance of resistor 33 is not limited to the value of 3300 ohms, but may be either larger or smaller, the rise and fall times and frequency being in inverse relation to the resistance selected. For example, with a value for resistor 33 of 6800 ohms frequencies up to one megacycle may be amplified.

As a further improvement the junction 36 of resistor 33 and capacitor 34 is connected to a terminal of the circuit which has a fixed potential equal to the lowest or bottoming value which the potential $E_b$ of anode 14 is expected to attain. Thus the point 36 has the direct current potential level of minimum $E_b$ but the alternating current potential level of ground. This fixed potential may be secured, for example, from a suitable terminal of a voltage divider consisting of resistors 37 and 38 connected between $+E_{bb}$ and ground, or resistor 37 may be replaced by a cathode follower tube.

Inductors 39 and 41 are employed to resonate or peak the circuit at the high end of its frequency range in the conventional manner, thus extending and flattening the frequency characteristic.

In the operation of this circuit the feedback resistor 24 never has more than the resistance of resistor 33 presented to it, and "perceives" less resistance when tube 12 is conducting because its plate resistance parallels the resistance of resistor 33. With usual interelectrode and stray capacitance values the rise and fall times will not be greater than 0.06 $\mu$s. when resistor 33 has a resistance of 3300 ohms corresponding to an upper cutoff for sinusoidal signals of about 8.3 mc.p.s. The cutoff for rectangular signals with good retention of the rectangular shape will therefore be of the order of 2 megapulses/sec., and will be extended to 6 megapulses/sec. with lower values for 33. The output impedance at conductor 31 will not rise over 800 ohms during any part of the pulse cycle when tube 12 is a triode, and may range between 200 and 800 ohms during the cycle. When tube 12 is a pentode the upper limit is 1700 ohms under the assumed conditions. The effect of placing junction 36 at the potential $E_b$ is completely to eliminate current drain on triode 11 by resistor 33 during the critical bottoming part of the cycle, and reducing current drain during the remainder of the cycle, thus greatly improving circuit linearity.

The invention thus greatly increases the upper frequency limit of the conventional series amplifier, and greatly improves the output impedance by preventing its becoming infinite at any part of the signal cycle, even when tube 12 is cut off, and maintaining the output impedance substantially constant at a low value throughout the cycle. The improvement also greatly extends the bandwidth.

When resistor 33 has the value mentioned, the frequency limit will be as heretofore set forth, but by lowering the resistance of this resistor both the frequency limit and the bandwidth may be extended. For example, when the resistance of resistor 33 is reduced to a very low value, such as one hundred ohms or so, the upper limit of the frequency band is increased to the order of 50 mc.p.s., and the bandwidth also will be of this order.

Figure 2:
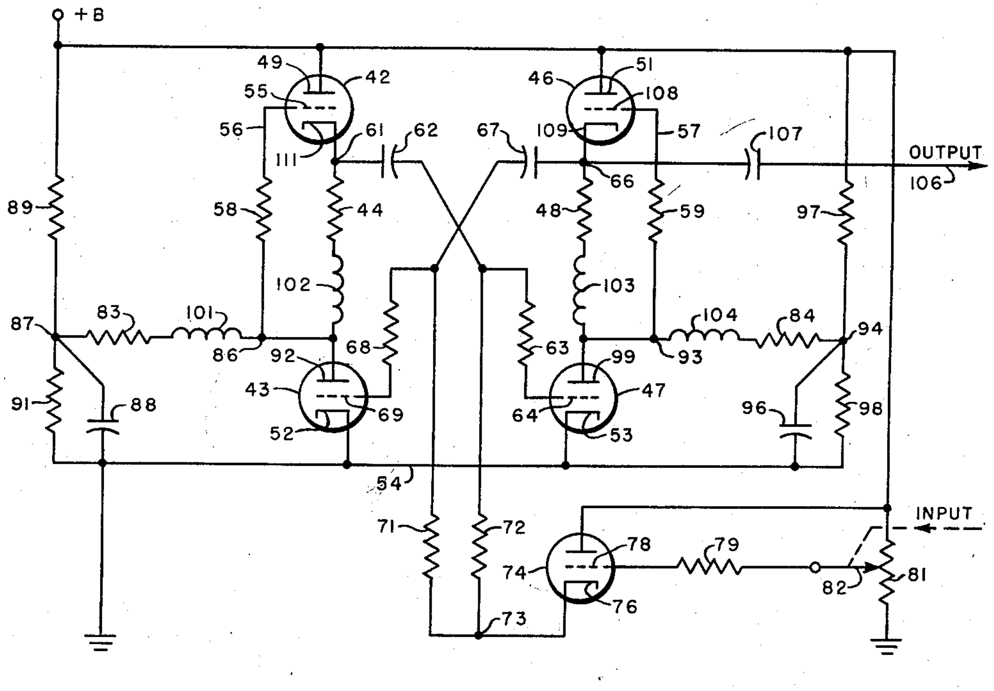
Figure 2 is a schematic diagram of an astable multivibrator incorporating this invention.

In Fig. 2 a multivibrator comprises two improved series amplifiers interconnected with the output of each wired to the input of the other to form an astable multivibrator circuit. One basic series amplifier includes triode 42 and triode 43 connected in series by resistor 44. The other basic series amplifier is identical and includes triode 46, triode 47 and series resistor 48. Power is applied to the anodes 49 and 51. The cathodes 52 and 53 of the triodes 43 and 47 are connected directly to the ground return 54 of the power terminals as no biasing cathode resistors are required. Series amplifier feedback paths 56 and 57 from grids 55 and 108 to the anodes 92 and 99 include antiparasitic resistors 58 and 59. The two series amplifiers are interconnected by one path from output junction 61 through coupling capacitor 62 and antiparasitic resistor 63 to the input grid 64 of the series amplifier tube 47, and by another path from output junction 66 through coupling capacitor 67 and antiparasitic resistor 68 to the input grid 69 of the series amplifier tube 43. The grids 64 and 69 of the tubes 43 and 47 are biased through equal resistors 71 and 72 connected to an adjustable direct potential source.

One of the advantages of this multivibrator oscillator resides in the linearity of the frequency of its output relative to the direct potential applied at junction 73 through the grid return resistors 71 and 72 to grids 69 and 64. Since the currents through these resistors are the charging currents for capacitors 62 and 67, the potential at junction 73 determines the rate of charge and hence the frequency of oscillation. It is therefore desirable, in the interest of linearity, to drive the junction 73 from a low impedance source. Cathode follower 74 is employed for this purpose. Its cathode 76 is connected directly to the junction 73 to minimize current changes and increase linearity. The cathode follower grid 78 is connected through a resistor 79 to a voltage divider 81, the position of the slider 82 thereof constituting the input control to the multivibrator.

Relatively low resistance resistors 83 and 84 correspond to resistor 33, Fig. 1, and constitute important elements of this invention. Resistor 83, Fig. 2, is connected between feedback junction 86 of the series amplifier 42—43 and junction 87 of the divider 89—91. Junction 87 is maintained at signal ground potential by a large grounded capacitor 88 connected thereto and maintained at a fixed direct potential by constituting an intermediate terminal of a voltage divider consisting of resistors 89 and 91 connected between positive potential and ground. This fixed potential is made to equal the lowest potential during the oscillating cycle of the anode 92. Resistor 84 is connected between feedback junction 93 of the series amplifier 46—47 and junction 94. Junction 94 is maintained at signal ground potential by large grounded capacitor 96 connected thereto, and maintained at a fixed direct potential by connection to resistors 97 and 98 constituting a voltage divider connected between positive potential and ground. This fixed potential equals the lowest cyclic potential of the anode 99.

Small inductors 101, 102, 103 and 104 serve to peak the frequency characteristic of the multivibrator at its high end, thus extending its frequency range upward.

In the operation of this multivibrator, when the series amplifier 46—47 first becomes conductive the impedance at the output conductor 106 presented by junction 66 through large coupling capacitor 107 is low, and may be calculated in accordance with the following equation. The circuit constants in the two series amplifiers are identical and the symbols of the equations have the same meanings, applying to either series amplifier, as previously defined. When the tube 43/47 is a triode, $$Z_0=\frac{r_{p1}[r_{p2}(R_k+R_2)+R_kR_2]}{r_{p2}R_2+[r_{p1}+(1+\mu_1)R_k](r_{p2}+R_2)} \qquad (5)$$

in which $R_2$ is the resistance of either resistor 83 or resistor 84. When the tube 43/47 is a pentode, $$Z_0=\frac{r_{p1}}{\mu_1}\cdot\frac{(r_{p1}+\mu_1R_k)(R_k+R_2)}{R_k[R_2+r_{p1}+(1+\mu_1)R_k]} \qquad (6)$$

The potential of junction 66 with one set of parameters, for example, is such as to bring the potential of grid 69 to −40 volts at this instant. Capacitor 67 immediately commences charging through resistor 71 with the charging current determined by the potential across resistor 71 divided by its resistance. This assumes junction 73 has substantially zero impedance to ground level which can be assumed if the resistance of resistor 71 is large compared to the cathode impedance of cathode follower 74. The direct current potential of junction 73 is therefore determined exclusively by the setting of slider 82, in turn determining the potential across resistor 71.

The potential of grid 69 rises exponentially from below cutoff to a potential above cutoff. At cutoff triode 43 begins to conduct and conduction rapidly shifts from the series amplifier 46—47 to the series amplifier 42—43. However, at no time does the time constant of the series amplifier 46—47 become large because, even when no current flows in triode 47 the grid 108 "sees" the very low impedance of resistor 84. Therefore, when the potential of cathode 109 rises to the nonconductive half cycle level its rise time is very short. Additionally, the output conductor 106 never "sees" an infinite or even very large impedance because the plate resistance of triode 46 never becomes infinite. This is the case because, even when triode 47 is not conducting triode 46 is conductive for alternating currents through the path consisting of cathode junction 66, cathode resistor 48, inductor 103, inductor 104, resistor 84, voltage divider junction 94 and capacitor 96 to ground.

During the remainder of the cycle the same actions occur, interchanging the functions of the two series amplifiers. Output may be taken either from cathode 109, as shown, or from cathode 111.

The astable multivibrator described has the advantages of sharp rise and fall characteristics, greatly improved upper frequency limit and increased range of frequency output, as well as the excellent linearity and low output impedance inherent in the series amplifier component. Additionally the output impedance is not allowed to become infinite during the cycle or even to increase greatly, in distinction to the conventional series amplifier multivibrator. By reducing the series resistors 83 and 84 to very low values of the order of 100 ohms, both the upper frequency limit of free sinusoidal oscillation and the bandwidth over which oscillations will be produced are increased to the order of 50 mc.p.s. for average receiving tubes. With special high transconductance tubes multivibrators of this type could be made to operate at 50 megapulses/sec. which is equivalent to a 200 mc.s. sinusoidal bandwidth.

What is claimed is:

1. A multivibrator comprising, first and second pairs of serially connected tubes each of which is provided with at least anode, cathode and control electrodes, the cathode of one of each of said pairs of tubes being resistively connected to the anode of the other tube of its respective pair of tubes and the control electrode of each of said ones of said pairs of tubes being conductively connected to the anode of the other tubes of its respective pair, capacitive cross interconnections between the cathode of said one of said first pair of tubes and the control electrode of the other of said second pair of tubes and between the cathode of said one of said second pair of tubes and the control electrode of the other of said first pair of tubes, a potential supply source applying a positive potential to the anodes of each of said one of said first and second pairs of tubes, a first impedor connected between the anode and cathode of the other of said first pair of tubes, and a second impedor connected between the anode and cathode of the other of said second pair of tubes.

2. A multivibrator in accordance with claim 1 in which each of said first and second impedors consists of a resistor connected in series with a capacitor, the resistor end of the series combination being connected to the anode of the respective tube and the capacitor end thereof being connected to the cathode of the respective tube, and means for applying a fixed potential to the common junctions of each of said resistor capacitor series impedors.

3. A multivibrator comprising a first pair of tubes each having at least anode, cathode and control electrodes, the cathode of one of said first pair of tubes being connected through a series resistance to the anode of the other of said pair of tubes and the control electrode of said one tube being conductively connected to the anode of the other of said pair of tubes, a second pair of tubes having at least anode, cathode and control electrodes, the cathode of one of said second pair of tubes being connected through a series resistance to the anode of the other of said second pair of tubes, and the control electrode of said one tube of said second pair of tubes being conductively connected to the anode of the other of said second pair of tubes, a first capacitor interconnecting the cathode of said one of said first pair of tubes and the control electrode of the other of said second pair of tubes, a second capacitor interconnecting the cathode of said one of said second pair of tubes and the control electrode of the other of said first pair of tubes, a first resistor having a value not exceeding 6800 ohms connected between the anode of the other of said first pair of tubes and a terminal of fixed potential, a capacitor connected between said fixed potential terminal and ground, a second resistor having a value not exceeding 6800 ohms connected between the anode of the other of said second pair of tubes and a second terminal of fixed potential, and a capacitor connected between said second fixed potential terminal and ground.

References Cited in the file of this patent

UNITED STATES PATENTS

| | | |
|---|---|---|
| 2,267,732 | Hansell | Dec. 30, 1941 |
| 2,750,450 | Achenbach et al. | June 12, 1956 |

FOREIGN PATENTS

| | | |
|---|---|---|
| 894,303 | France | Dec. 20, 1944 |